United States Patent
Morimoto (10) Patent No.: US 11,309,788 B2
(45) Date of Patent: Apr. 19, 2022

(54) SEMICONDUCTOR DRIVE DEVICE AND POWER CONVERSION APPARATUS

(71) Applicant: FUJI ELECTRIC CO., LTD., Kawasaki (JP)

(72) Inventor: Toshimitsu Morimoto, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 2 days.

(21) Appl. No.: 17/103,256

(22) Filed: Nov. 24, 2020

(65) Prior Publication Data

US 2021/0194351 A1     Jun. 24, 2021

(30) Foreign Application Priority Data

Dec. 18, 2019   (JP) .............................. JP2019-227910

(51) Int. Cl.
*H02M 1/32*    (2007.01)
*H02M 1/08*    (2006.01)
(Continued)

(52) U.S. Cl.
CPC .............. *H02M 1/32* (2013.01); *H02M 1/08* (2013.01); *H02M 3/33523* (2013.01); *H02M 1/0009* (2021.05)

(58) Field of Classification Search
CPC ...... H02M 1/32; H02M 1/08; H02M 3/33523; H02M 1/0009; H02M 1/0025; H02M 1/325
See application file for complete search history.

(56) References Cited

U.S. PATENT DOCUMENTS 7,518,836 B2    4/2009  Kim et al.
2009/0128209 A1*  5/2009  Chu .......................... H03K 7/08
                                                        327/177
(Continued)

FOREIGN PATENT DOCUMENTS

JP    2000-323974 A    11/2000
JP    2018-057105 A     4/2018

OTHER PUBLICATIONS

FAN6756—mWSaver PWM Controller, "Sense Short-Circuit Protection (SSCP)", p. 15, [online], 2011, Fairchild Semiconductor Corporation, [searched on Sep. 2, 2019], Internet <URL:https://www.onsemi.com/pub/Collateral/FAN6756-D.pdf>).

*Primary Examiner* — Kyle J Moody
(74) *Attorney, Agent, or Firm* — Rabin & Berdo, P.C.

(57) ABSTRACT

First and second current detection resistors connected in series are used as current detection resistors for detecting a main current of a switching element. A single-fault detection circuit divides a voltage detected from the main current by first to third resistors. A first comparator compares a voltage at a Detect terminal with a voltage at a connection point of the first and second resistors, and a second comparator compares the voltage at the Detect terminal with a voltage at a connection point of the second and third resistors. When either one of the first and second current detection resistors is short-circuited, the corresponding one of the first and second comparators outputs an L-level signal. Accordingly, an AND circuit outputs a signal indicating a single fault. Since this signal reduces a threshold voltage of the individual comparator by half, the same output voltage as before the fault is maintained.

6 Claims, 7 Drawing Sheets

(51) Int. Cl.
    *H02M 3/335*     (2006.01)
    *H02M 1/00*     (2006.01)

(56) References Cited

U.S. PATENT DOCUMENTS

2014/0016376 A1\* 1/2014 Gao .................. H02M 3/33507
                                                                          363/21.17
2018/0191254 A1\* 7/2018 Feng ....................... H02M 1/08

\* cited by examiner

|  | COMPARATOR 64 | COMPARATOR 65 | OUTPUT |
|---|---|---|---|
| FIRST CURRENT DETECTION RESISTOR 16 IS SHORT-CIRCUITED | 0 | 1 | 0 |
| SECOND CURRENT DETECTION RESISTOR 17 IS SHORT-CIRCUITED | 1 | 0 | 0 |
| NORMAL STATE | 1 | 1 | 1 |

SEMICONDUCTOR DRIVE DEVICE AND POWER CONVERSION APPARATUS

CROSS-REFERENCE TO RELATED APPLICATION

This application is based upon and claims the benefit of priority of the prior Japanese Patent Application No. 2019-227910, filed on Dec. 18, 2019, the entire contents of which are incorporated herein by reference.

BACKGROUND OF THE INVENTION

1. Field of the Invention

The embodiment discussed herein relates to a semiconductor drive device and a power conversion apparatus using this semiconductor drive device.

2. Background of the Related Art

Various safety standards are specified for power conversion apparatuses such as alternating current (AC) adapters. One of the safety standards is Limited Power Sources (LPS). The LPS is formulated to prevent generation of smoke and fire of AC adapters, including their outer plastic cases. The LPS limits the output power or current within a limit when an open- or short-circuit fault (a single fault) occurs in any single part of an AC adapter.

Generally, a switching-type AC adapter includes a semiconductor switching element for performing power conversion and a control integrated circuit (IC) for controlling the switching element. The control IC has various protection functions such as overcurrent protection, overvoltage protection, short-circuit protection, and overheat protection. Among these protections, regarding the overcurrent protection, a main current flowing through the switching element is converted into a voltage by a current detection resistor. In this way, the main current is detected indirectly, and the overcurrent protection is performed based on the detected main current. Namely, the voltage obtained by this conversion is monitored. When the voltage exceeds a certain threshold voltage, the main current flowing through the switching element is determined to be an overcurrent. In this case, the control IC stops or reduces the main current to prevent thermal destruction of the switching element due to the overcurrent.

When the current detection resistor directly detects the main current, the current detection resistor detects a large current value, and a large wattage resistor is used. Thus, in many cases the current detection resistor is externally attached to the control IC. Thus, the current detection resistor could be deteriorated and short-circuited at the time of assembly of the AC adapter or due to its product lifetime. When a single fault such as a short circuit of the current detection resistor occurs, since the main current of the switching element is not converted into a voltage, the control IC becomes unable to perform its overcurrent protection, and the switching element could be destructed by an overcurrent.

In relation to this, there is proposed a known technique for safely protecting a switching element even when a single fault such as a short circuit of a current detection resistor occurs (see, for example, literature 1: FAN6756-mWSaver PWM Controller, "Sense Short-Circuit Protection (SSCP)", p. 15, [online], 2011, Fairchild Semiconductor Corporation, [searched on Sep. 2, 2019], Internet <URL:https://www.on-semi.com/pub/Collateral/FAN6756-D.pdf>). According to literature 1, it is determined whether a state in which a current detection voltage is very low due to a short circuit of a current detection resistor has continued for a certain period per switching cycle. Next, when failure of detection of the current detection voltage has repeated a predetermined number of times, the control IC immediately stops the switching operation of the switching element. In this way, even when a single fault occurs, the safety of the switching element is ensured.

However, while the above literature 1 assumes that a short circuit of the current detection resistor makes it impossible to detect the current detection voltage, in reality the current detection voltage could be detected by the presence of a parasitic inductance component. Thus, the technique discussed in the above literature 1 has a problem in that the switching operation could not be stopped when the current detection voltage is detected by the presence of a parasitic inductance component.

SUMMARY OF THE INVENTION

According to one aspect of the embodiment, there is provided a semiconductor drive device for controlling a switching element to which a first current detection resistor and a second current detection resistor that are connected in series with each other, based on a value of a main current flowing through the switching element detected by the first current detection resistor and the second current detection resistor. The semiconductor drive device includes: a single-fault detection circuit configured to receive a first current detection voltage at a connection point between the switching element and the first current detection resistor and a second current detection voltage at a connection point between the first current detection resistor and the second current detection resistor, and detect a short-circuit state of the first current detection resistor or the second current detection resistor; and a control circuit including a comparator configured to determines a switching control timing of the switching element by comparing the first current detection voltage with a first threshold voltage or a second threshold voltage, and a threshold voltage switching circuit configured to output the first threshold voltage while the single-fault detection circuit detects neither a short-circuit state of the first current detection resistor nor a short-circuit state of the second current detection resistor, and to output the second threshold voltage, which is less than the first threshold voltage, upon the single-fault detection circuit detecting either the short-circuit state of the first current detection resistor or the short-circuit state of the second current detection resistor.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Hereinafter, an embodiment will be described in detail with reference to drawings and based on an example in which a semiconductor drive device is applied to a control IC of a power conversion apparatus such as a flyback-type switching power supply apparatus.

Figure 1:
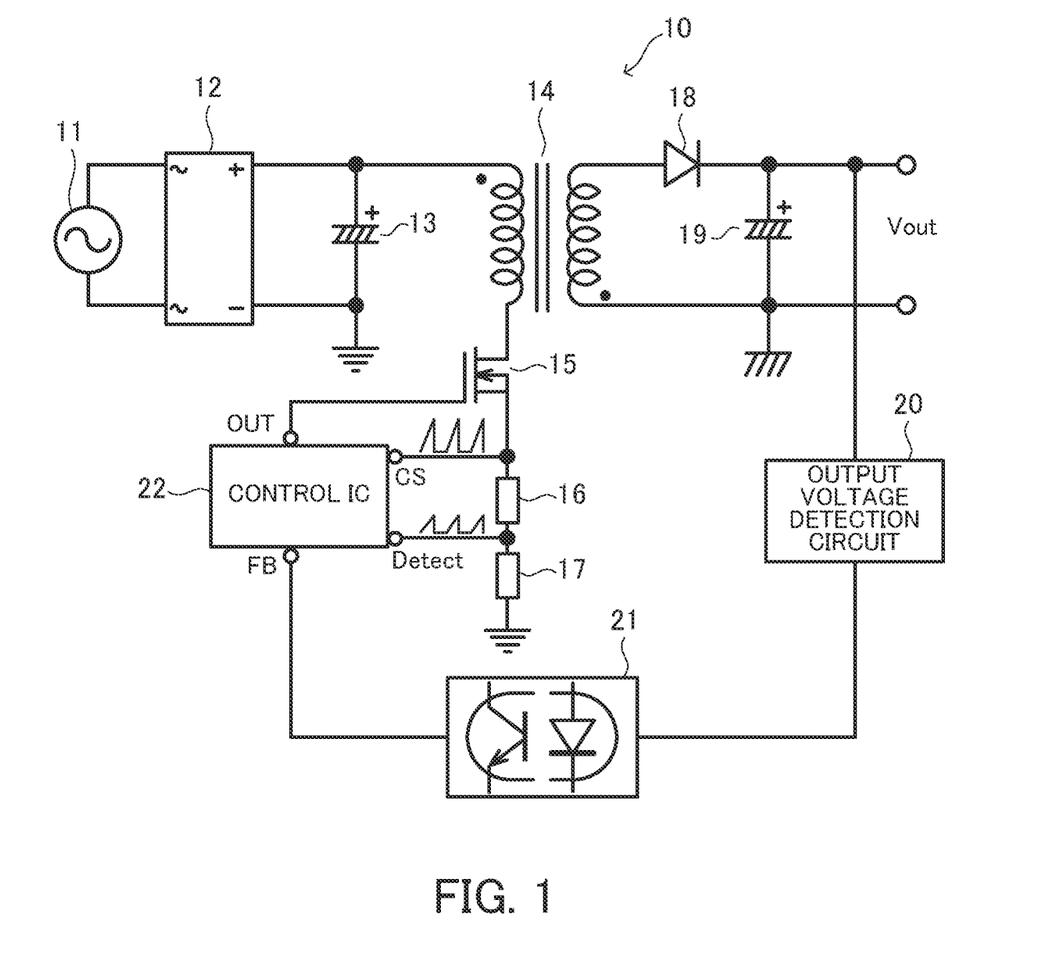
FIG. 1 is a circuit diagram illustrating a switching power supply apparatus using a control IC according to an embodiment.
Figure 2:
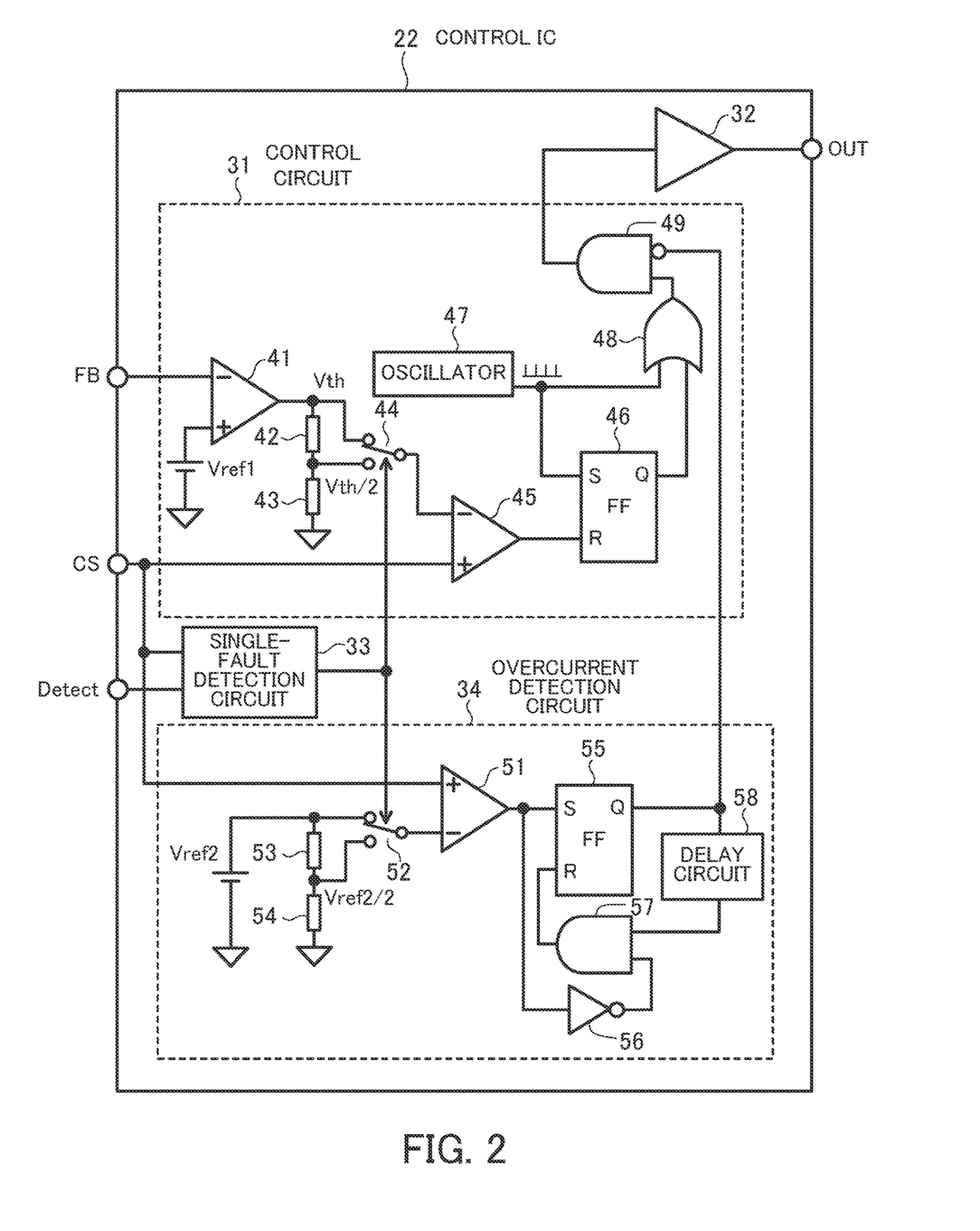
FIG. 2 is a circuit diagram illustrating a configuration example of the control IC.
Figure 3:
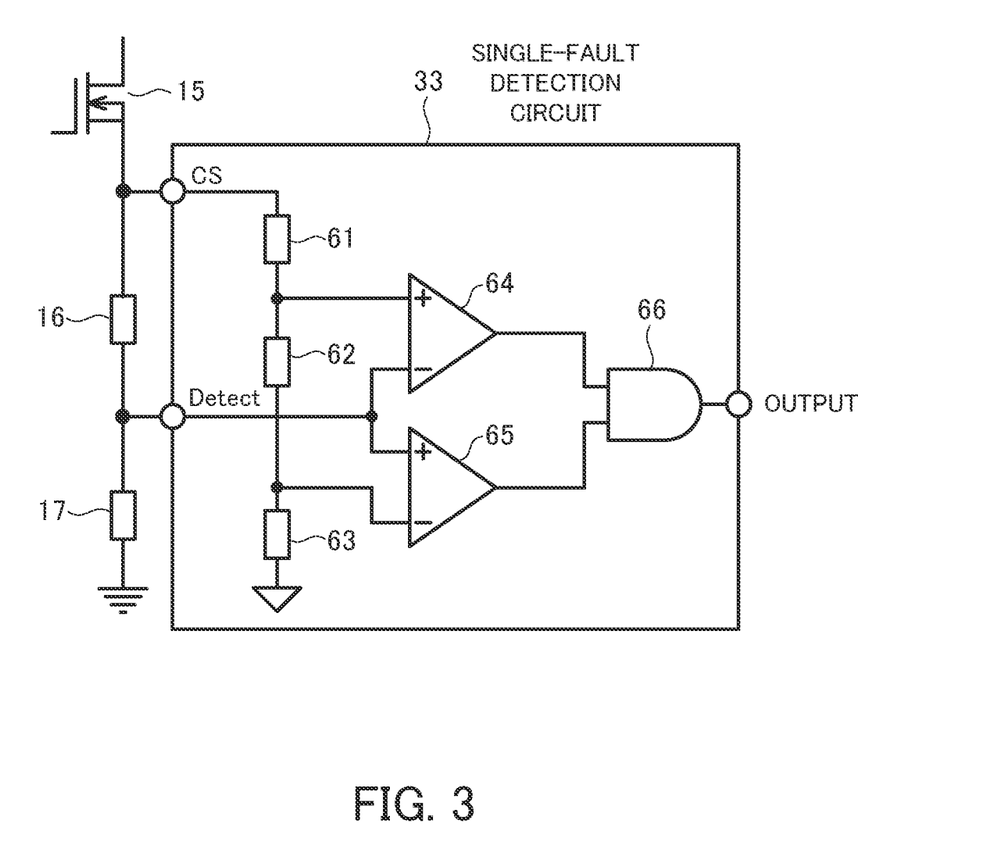
FIG. 3 is a circuit diagram illustrating a configuration example of a single-fault detection circuit.
Figure 4:
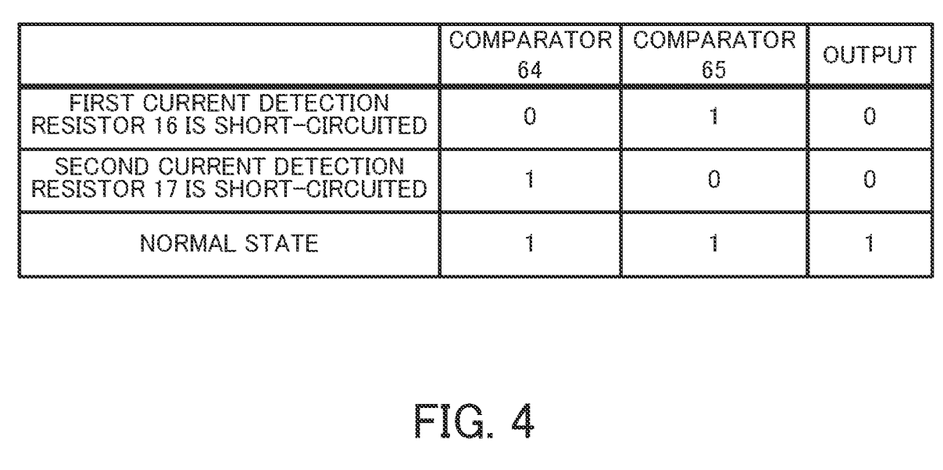
FIG. 4 is a truth table illustrating an operation of the single-fault detection circuit.

FIG. 1 is a circuit diagram illustrating a switching power supply apparatus 10 using a control IC 22 according to an embodiment. FIG. 2 is a circuit diagram illustrating a configuration example of the control IC 22. FIG. 3 is a circuit diagram illustrating a configuration example of a single-fault detection circuit 33. FIG. 4 is a truth table illustrating an operation of the single-fault detection circuit 33.

This switching power supply apparatus 10 illustrated in FIG. 1 includes a diode bridge 12 that is connected to a commercially available AC power supply 11 and that performs full-wave rectification on the AC voltage of the AC power supply 11. This diode bridge 12 has a positive terminal that is connected to the positive terminal of a capacitor 13 and to one terminal of the primary winding of a transformer 14. The diode bridge 12 has a negative terminal that is connected to the negative terminal of the capacitor 13 and to the ground.

The other terminal of the primary winding of the transformer 14 is connected to the drain terminal of a switching element 15. Herein, a metal-oxide-semiconductor field-effect transistor (MOSFET) is used as the switching element 15. The source terminal of the switching element 15 is connected to one terminal of a first current detection resistor 16, and the other terminal of the first current detection resistor 16 is connected to one terminal of a second current detection resistor 17. The other terminal of the second current detection resistor 17 is connected to the ground.

One terminal of the secondary winding of the transformer 14 is connected to the anode terminal of a diode 18, and the cathode terminal of the diode 18 is connected to the positive terminal of a capacitor 19 and to the positive output terminal of this switching power supply apparatus 10. The other terminal of the secondary winding of the transformer 14 is connected to the negative terminal of the capacitor 19, the negative output terminal of this switching power supply apparatus 10, and the ground. The output terminals of the switching power supply apparatus 10 are connected to load, and an output voltage Vout is supplied to the load.

The positive terminal of the capacitor 19 is also connected to the input terminal of an output voltage detection circuit 20, and the output terminal of the output voltage detection circuit 20 is connected to an FB terminal of the control IC 22 via a photocoupler 21.

The control IC 22 is a control circuit that controls switching of the switching element 15 and constitutes the semiconductor drive device according to the embodiment. The control IC 22 includes a CS terminal, a Detect terminal, and an OUT terminal, in addition to the FB terminal. The OUT terminal of the control IC 22 is connected to the gate terminal of the switching element 15. The CS terminal of the control IC 22 is connected to a connection point of the switching element 15 and the first current detection resistor 16. The Detect terminal of the control IC 22 is connected to a connection point of the first current detection resistor 16 and the second current detection resistor 17.

In this switching power supply apparatus 10 including the control IC 22 for switching control, the switching operation of the switching element 15 is controlled, and a rectified voltage of the AC input voltage is converted into a predetermined direct-current (DC) voltage by the transformer 14. Namely, power is accumulated in the transformer 14 during an individual on-period of the switching element 15, and the accumulated power is transferred to the secondary side of the transformer 14 by using the back electromotive force of the transformer 14 when the switching element 15 is switched to off. The power transferred to the secondary side of the transformer 14 is rectified, smoothed, and converted into the DC output voltage Vout. The output voltage Vout is supplied to the load from the output terminals of the switching power supply apparatus 10.

The output voltage Vout is also supplied to the output voltage detection circuit 20. The output voltage detection circuit 20 compares the output voltage Vout with an internal reference voltage and outputs information about the error between the output voltage Vout and the reference voltage. The error information is fed back to the FB terminal of the control IC 22 located on the primary side via the photocoupler 21.

The CS terminal and the Detect terminal of the control IC 22 receive current detection signals, which are voltages obtained by the first current detection resistor 16 and the second current detection resistor 17 that convert a main current flowing through the switching element 15 when the switching element 15 is on.

Based on the error signal received by the FB terminal and the current detection signal received by the CS terminal, the control IC 22 changes the on-width of a pulse signal supplied to the switching element 15 and outputs the pulse signal from the OUT terminal. In this way, the control IC 22 controls the switching of the switching power supply and controls the output voltage Vout outputted by the secondary side. In addition, based on the current detection signals received by the CS terminal and the Detect terminal, the control IC 22 detects a single fault caused by a short circuit of the first current detection resistor 16 or the second current detection resistor 17 and performs an overcurrent protection operation.

Hereinafter, a specific configuration example of the control IC 22 will be described. As illustrated in FIG. 2, the control IC 22 includes a control circuit 31, a drive circuit 32, a single-fault detection circuit 33, and an overcurrent detection circuit 34. The control circuit 31 includes the FB terminal, the CS terminal, an input terminal connected to the output terminal of the single-fault detection circuit 33, and an output terminal connected to the input terminal of the drive circuit 32. The drive circuit 32 has an output terminal connected to the OUT terminal connected to the gate terminal of the switching element 15.

The single-fault detection circuit 33 includes input terminals connected to the CS terminal and the Detect terminal.

The CS terminal receives a current detection voltage, which is a voltage converted from the main current of the switching element 15 by the first current detection resistor 16 and the second current detection resistor 17. The Detect terminal receives a current detection voltage, which is a voltage converted from the main current of the switching element 15 by the second current detection resistor 17.

The overcurrent detection circuit 34 includes an input terminal connected to the CS terminal. When the overcurrent detection circuit 34 has detected that the main current of the switching element 15 is an overcurrent, the overcurrent detection circuit 34 outputs an overcurrent detection signal for stopping the operation of the switching power supply apparatus 10.

The control circuit 31 in the control IC 22 performs a pulse width modulation (PWM) control operation. The control circuit 31 includes an error amplifier 41 having an inverting input terminal connected to the FB terminal and having a non-inverting input terminal to which a reference voltage Vref1 is applied. The error amplifier 41 has an output terminal connected to one terminal of a resistor 42. The other terminal of the resistor 42 is connected to one terminal of a resistor 43, and the other terminal of the resistor 43 is connected to the ground. The output terminal of the error amplifier 41 is also connected to a first fixed contact of a switch 44, and a second fixed contact of the switch 44 is connected to a connection point of the resistors 42 and 43. The switch 44 has a moving contact connected to the inverting input terminal of a comparator 45, and the non-inverting input terminal of the comparator 45 is connected to the CS terminal. The comparator 45 has an output terminal connected to the reset input terminal of an RS flip-flop 46. The set input terminal of the RS flip-flop 46 is connected to the output terminal of an oscillator 47 and a first input terminal of an OR circuit 48. The output terminal of the RS flip-flop 46 is connected to a second input terminal of the OR circuit 48, and the output terminal of the OR circuit 48 is connected to the positive logic input terminal of an AND circuit 49. The output terminal of the AND circuit 49 is connected to the input terminal of the drive circuit 32. The negative logic input terminal of the AND circuit 49 is connected to the output terminal of the overcurrent detection circuit 34. The resistor 42, the resistor 43, and the switch 44 constitute a threshold voltage switching circuit. For example, the switch 44 is constituted by a semiconductor analog switch having a logic control terminal, such as a transfer gate.

The switch 44 has a control terminal connected to the output terminal of the single-fault detection circuit 33. When both of the first current detection resistor 16 and the second current detection resistor 17 are in a normal state, the switch 44 selects the output terminal of the error amplifier 41. In addition, when the single-fault detection circuit 33 has detected a single fault of the first current detection resistor 16 or the second current detection resistor 17, the switch 44 selects the connection point of the resistors 42 and 43.

The oscillator 47 in the control circuit 31 generates a signal for switching the switching element 15. Namely, when the oscillator 47 outputs a high (H) level signal, the H-level signal is supplied to the drive circuit 32 via the OR circuit 48 and the AND circuit 49 and sets the RS flip-flop 46. The set RS flip-flop 46 outputs an H-level output signal from its output terminal, and the H-level output signal is supplied to the drive circuit 32 via the OR circuit 48 and the AND circuit 49. At this point, since the negative logic input terminal of the AND circuit 49 is receiving a low (L) level signal from the overcurrent detection circuit 34, the transfer of a drive signal from the OR circuit 48 to the drive circuit 32 is enabled. Even when the signal outputted by the oscillator 47 drops to an L level, the set RS flip-flop 46 maintains its set state.

The on-width of the drive signal supplied to the drive circuit 32 is determined by timing at which the RS flip-flop 46 is reset. Specifically, when the switching element 15 is on, the main current is increased. Next, when the voltage at the CS terminal corresponding to the main current exceeds a voltage obtained by amplifying the error between the voltage at the FB terminal and the reference voltage Vref1, the comparator 45 resets the RS flip-flop 46. Consequently, since the signal supplied to the drive circuit 32 drops to an L level, the switching element 15 is set to off. In this way, the comparator 45 determines the switching control timing of the switching element 15.

The overcurrent detection circuit 34 includes a comparator 51 having a non-inverting input terminal connected to the CS terminal. The comparator 51 has an inverting input terminal connected to a moving contact of a switch 52. The switch 52 has a first fixed contact connected to one terminal of a resistor 53. The other terminal of the resistor 53 is connected to one terminal of a resistor 54, and the other terminal of the resistor 54 is connected to the ground. A reference voltage Vref2 is applied to the first fixed contact of the switch 52. The switch 52 has a second fixed contact connected to a connection point of the resistors 53 and 54. Herein, the resistor 53, the resistor 54, and the switch 52 constitute an overcurrent detection threshold voltage switching circuit. The switch 52 has a control terminal connected to the output terminal of the single-fault detection circuit 33.

The comparator 51 has an output terminal connected to the set input terminal of an RS flip-flop 55 and to the input terminal of a NOT circuit 56. The NOT circuit 56 has an output terminal connected to one input terminal of an AND circuit 57, and the AND circuit 57 has an output terminal connected to the reset input terminal of the RS flip-flop 55. The RS flip-flop 55 has an output terminal connected to the input terminal of a delay circuit 58, and the delay circuit 58 has an output terminal connected to the other input terminal of the AND circuit 57. The output terminal of the RS flip-flop 55 is the output terminal of the overcurrent detection circuit 34 and is connected to the negative logic input terminal of the AND circuit 49 in the control circuit 31.

The control terminal of the switch 52 is connected to the output terminal of the single-fault detection circuit 33. When both of the first current detection resistor 16 and the second current detection resistor 17 are in a normal state, the switch 52 selects the first fixed contact to which the reference voltage Vref2 is applied. In contrast, when the single-fault detection circuit 33 has detected a single fault of the first current detection resistor 16 or the second current detection resistor 17, the switch 52 selects the connection point of the resistors 53 and 54.

As illustrated in FIG. 3, the single-fault detection circuit 33 includes resistors 61 to 63, comparators 64 and 65, and an AND circuit 66. The resistor 61 has one terminal connected to the CS terminal and has the other terminal connected to one terminal of the resistor 62. The other terminal of the resistor 62 is connected to one terminal of the resistor 63, and the other terminal of the resistor 63 is connected to the ground. A connection point of the resistors 61 and 62 is connected to the non-inverting input terminal of the comparator 64, and the inverting input terminal of the comparator 64 is connected to the Detect terminal. The comparator 64 has an output terminal connected to a first input terminal of the AND circuit 66. A connection point of the resistors 62 and 63 is connected to the inverting input terminal of the comparator 65, and the non-inverting input terminal of the comparator 65 is connected to the Detect terminal. The comparator 65 has an output terminal connected to a second input terminal of the AND circuit 66. The AND circuit 66 has an output terminal connected to the control terminal of the switch 44 in the control circuit 31 and the control terminal of the switch 52 in the overcurrent detection circuit 34.

The embodiment assumes that both of the first current detection resistor 16 and the second current detection resistor 17 that detect the main current of the switching element 15 have a resistance value R1. The embodiment also assumes that all of the resistors 61 to 63 in the single-fault detection circuit 33 have a resistance value R2. In this way, in a normal state in which the first current detection resistor 16 and the second current detection resistor 17 are not short-circuited, the voltage that appears at the Detect terminal is ½ of the voltage that appears at the CS terminal. In the single-fault detection circuit 33, the voltage that appears at the connection point of the resistors 61 and 62 is ⅔ of the voltage that appears at the CS terminal, and the voltage that appears at the connection point of the resistors 62 and 63 is ⅓ of the voltage that appears at the CS terminal.

When the first current detection resistor 16 and the second current detection resistor 17 are in a normal state, ⅔ of the voltage that appears at the CS terminal is applied to the non-inverting input terminal of the comparator 64, and ½ of the voltage that appears at the CS terminal is applied to the inverting input terminal of the comparator 64. In this case, the comparator 64 outputs an H level signal "1", as illustrated in FIG. 4. In this case, ⅓ of the voltage that appears at the CS terminal is applied to the inverting input terminal of the comparator 65, and ½ of the voltage that appears at the CS terminal is applied to the non-inverting input terminal of the comparator 65. Thus, the comparator 65 outputs an H-level signal "1". Therefore, since both of the first and second input terminals of the AND circuit 66 receive an H level signal "1", the single-fault detection circuit 33 supplies an H-level signal "1" to the control terminal of the switch 44 in the control circuit 31. When the control terminal of the switch 44 receives the H-level signal, the switch 44 selects the output signal of the error amplifier 41 and supplies the output signal to the inverting input terminal of the comparator 45. In addition, when the control terminal of the switch 52 in the overcurrent detection circuit 34 receives the H-level signal, the switch 52 applies the reference voltage Vref2 to the inverting input terminal of the comparator 51.

Next, a case in which a single fault is caused by a short circuit of the first current detection resistor 16 will be described. In this case, ⅔ of the voltage that appears at the CS terminal is applied to the non-inverting input terminal of the comparator 64, and the voltage that appears at the CS terminal is directly applied to the inverting input terminal of the comparator 64. Thus, since the voltage applied to the inverting input terminal of the comparator 64 is higher than the voltage applied to the non-inverting input terminal of the comparator 64, the comparator 64 outputs an L-level signal "0". In contrast, ⅓ of the voltage that appears at the CS terminal is applied to the inverting input terminal of the comparator 65, and the voltage that appears at the CS terminal is applied to the non-inverting input terminal of the comparator 65. Thus, the comparator 65 outputs an H-level signal "1". As a result, since the first and second input terminals of the AND circuit 66 receive the L-level signal "0" and the H-level signal "1", respectively, the AND circuit 66 outputs an L-level signal "0" to the output terminal.

When the single-fault detection circuit 33 supplies the L-level signal "0" to the control terminal of the switch 44 in the control circuit 31, the switch 44 selects the output signal at the connection point of the resistors 42 and 43 and supplies this output signal to the inverting input terminal of the comparator 45. Assuming that both of the resistors 42 and 43 have a resistance value R3, ½ of a threshold voltage Vth outputted by the error amplifier 41 is applied to the inverting input terminal of the comparator 45 as a threshold voltage Vth/2. This is because that the current detection voltage based on the main current corresponds to half of the voltage obtained when both of the first current detection resistor 16 and the second current detection resistor 17 are in a normal state. Since the control circuit 31 includes a circuit that reduces the threshold voltage Vth that the comparator 45 refers to by half, even when a single fault caused by a short circuit of the first current detection resistor 16 occurs, the switching control is still performed by the current detection voltage detected by the remaining second current detection resistor 17.

In addition, when the single-fault detection circuit 33 supplies the L-level signal "0" to the control terminal of the switch 52 in the overcurrent detection circuit 34, the switch 52 selects the signal at the connection point of the resistors 53 and 54 and supplies this signal to the inverting input terminal of the comparator 51. Assuming that both of the resistors 53 and 54 have a resistance value R4, ½ of the reference voltage Vref2 is applied to the inverting input terminal of the comparator 51 as a threshold voltage Vref2/2. Since, due to the short circuit of the first current detection resistor 16, the current detection voltage based on the main current is half of the voltage obtained when both of the first current detection resistor 16 and the second current detection resistor 17 are in a normal state, the reference voltage that the comparator 51 refers to is also dropped by half. In this way, even when a single fault caused by a short circuit of the first current detection resistor 16 occurs, the overcurrent detection circuit 34 is still able to perform its normal overcurrent detection by using only the remaining second current detection resistor 17. Namely, even when a single fault caused by a short circuit of the first current detection resistor 16 or the second current detection resistor 17 occurs, the control IC 22 is able to perform its switching control operation and its overcurrent detection control operation in the same way as in a normal state in which the first current detection resistor 16 and the second current detection resistor 17 are not short-circuited.

Next, a case in which a single fault is caused by a short circuit of the second current detection resistor 17 will be described. In this case, an operation similar to that in the case of the above single fault caused by a short circuit of the first current detection resistor 16 is performed. Namely, ⅔ of the voltage that appears at the CS terminal is applied to the non-inverting input terminal of the comparator 64, and the inverting input terminal of the comparator 64 is connected to the ground. Thus, since the voltage at the non-inverting input terminal of the comparator 64 is higher than the voltage at the inverting input terminal, the comparator 64 outputs an H-level signal "1". In contrast, ⅓ of the voltage that appears at the CS terminal is applied to the inverting input terminal of the comparator 65, and the non-inverting input terminal of the comparator 65 is connected to the ground. Thus, the comparator 65 outputs an L-level signal "0". As a result, since the first and second input terminals of the AND circuit 66 receive the H-level "1" and the L-level signal "0", the AND circuit 66 outputs an L level signal "0" to the output terminal.

Since the single-fault detection circuit 33 outputs the L-level signal "0", the control circuit 31 and the overcurrent detection circuit 34 operate in the same way as in the case of the single fault caused by a short circuit of the first current detection resistor 16.

The overcurrent detection circuit 34 operates in the same way, whether one or both of the first current detection resistor 16 and the second current detection resistor 17 are in a normal state. Namely, since the comparator 51 outputs an L-level signal unless the comparator 51 detects an overcurrent, the RS flip-flop 55 also outputs an L-level signal. Since this L-level signal is also supplied to the negative logic input terminal of the AND circuit 49 in the control circuit 31, the AND circuit 49 enables the transfer of the output signal of the oscillator 47 and the RS flip-flop 46.

However, when the comparator 51 in the overcurrent detection circuit 34 has detected an overcurrent, the comparator 51 outputs an H-level signal, sets the RS flip-flop 55, and maintains the overcurrent detection state. In this case, since the H-level signal outputted by the RS flip-flop 55 is supplied to the negative logic input terminal of the AND circuit 49 in the control circuit 31, the AND circuit 49 disables the transfer of the output signal of the oscillator 47 and the RS flip-flop 46. Thus, the switching power supply apparatus 10 stops its switching operation. The H-level signal outputted by the RS flip-flop 55 is also inputted to the delay circuit 58. Since the delay circuit 58 supplies the L-level signal to the AND circuit 57 until a predetermined delay time elapses, the RS flip-flop 55 is not reset. Thus, even when the overcurrent detection state is resolved within a short time after the overcurrent detection state is maintained (even when the output of the comparator 51 is dropped to an L level), the RS flip-flop 55 maintains the overcurrent detection state until the predetermined delay time of the delay circuit 58 elapses.

Next, an operation of the switching power supply apparatus 10 having the above configuration will be described with reference to operation waveforms of its main portions.

Figure 5:
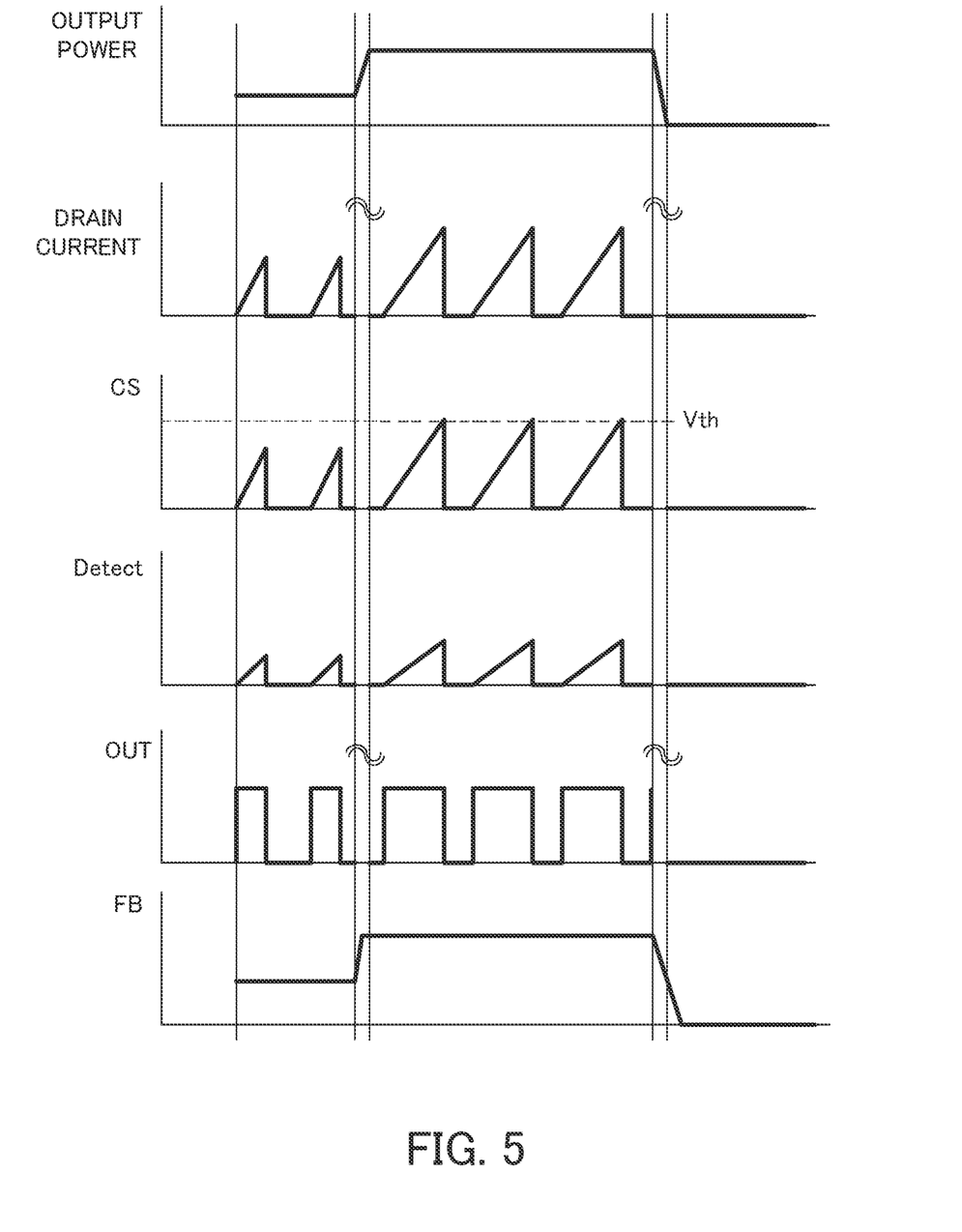
FIG. 5 illustrates operation waveforms of main portions of the switching power supply apparatus when a first current detection resistor and a second current detection resistor are in a normal state.
Figure 6:
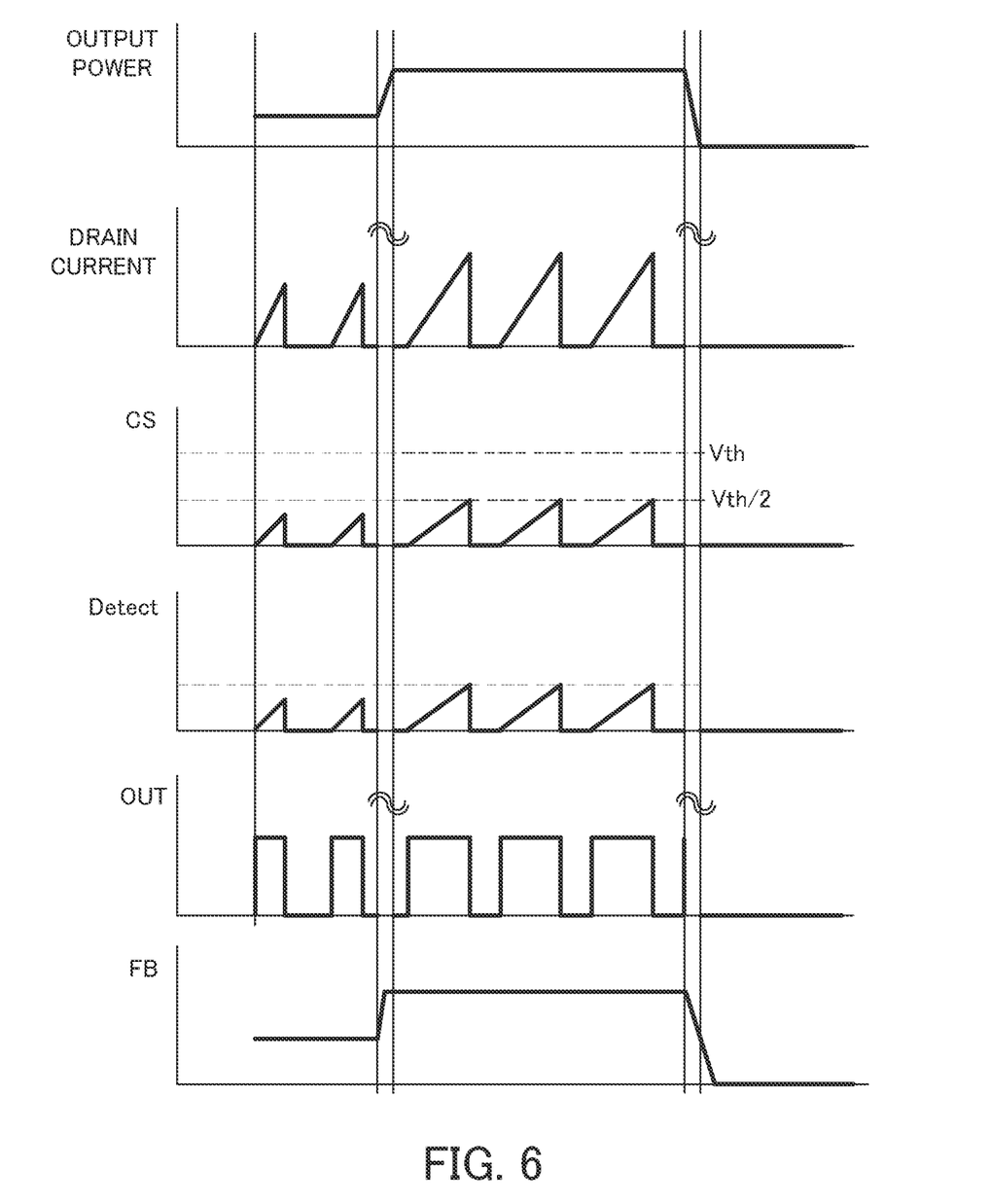
FIG. 6 illustrates operation waveforms of the main portions when the first current detection resistor is short-circuited.
Figure 7:
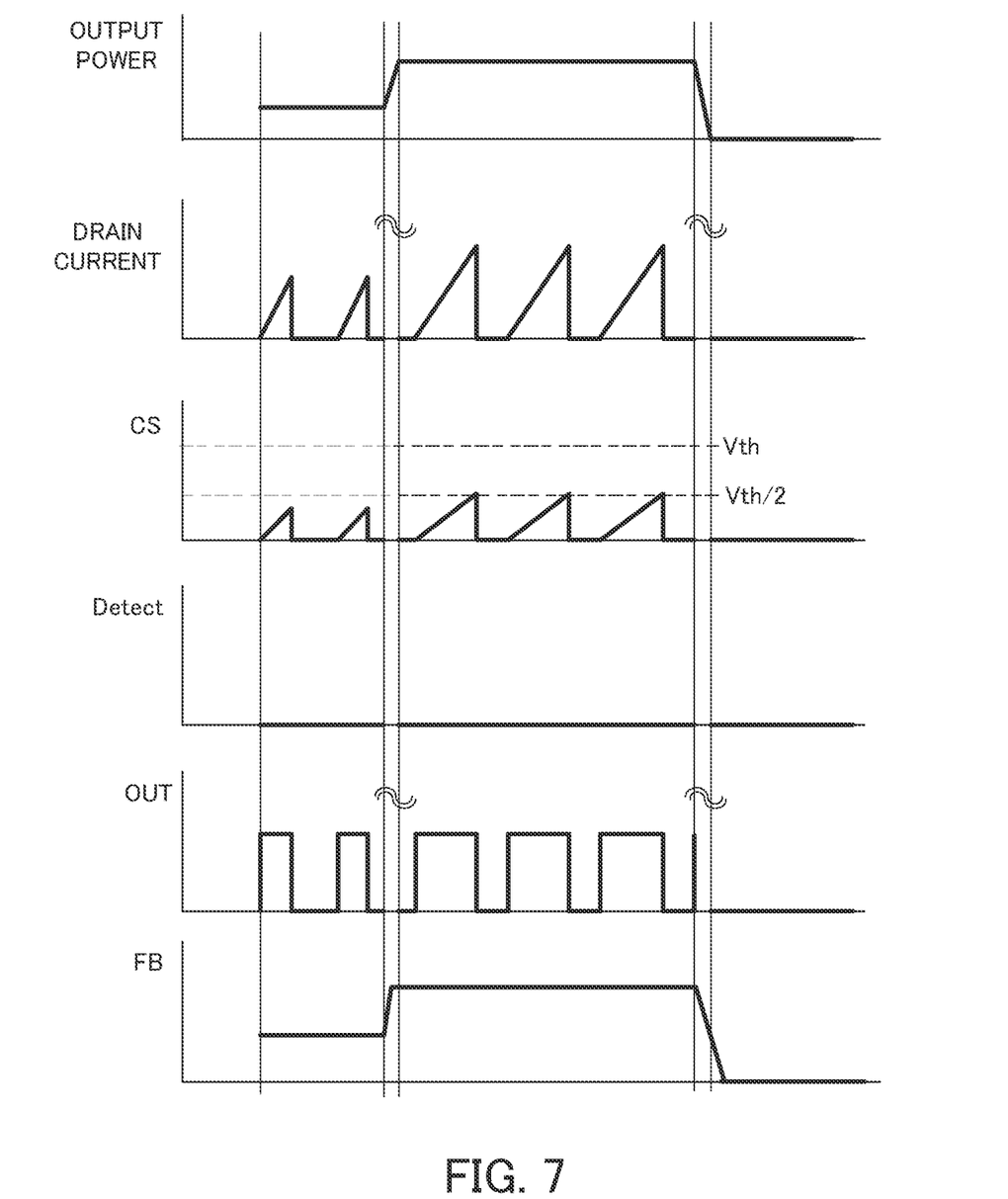
FIG. 7 illustrates operation waveforms of the main portions when the second current detection resistor is short-circuited.

FIG. 5 illustrates operation waveforms of main portions of the switching power supply apparatus when the first and second current detection resistors 16 and 17 are in a normal state. FIG. 6 illustrates operation waveforms of the main portions when the first current detection resistor 16 is short-circuited. FIG. 7 illustrates operation waveforms of the main portions when the second current detection resistor 17 is short-circuited. FIGS. 5 to 7 illustrate the output power of the switching power supply apparatus 10, the drain current of the switching element 15, the current detection voltage at the CS terminal, the current detection voltage at the Detect terminal, the pulse signal at the OUT terminal, and the feedback voltage at the FB terminal in the order from top to bottom.

First, a case in which the first current detection resistor 16 and the second current detection resistor 17 are in a normal state will be described. As illustrate in FIG. 5, when load is light such as in a standby state, the output power is small, and the feedback voltage at the FB terminal is also small. At this point, a pulse signal having a small duty ratio is outputted to the OUT terminal connected to the output of the drive circuit 32, and during each on-period of the pulse signal outputted to the OUT terminal, the drain current of the switching element 15, the current detection voltage at the CS terminal, and the current detection voltage at the Detect terminal appear. The maximum values of the current detection voltages at the CS terminal and the Detect terminal are based on the value of the feedback voltage at the FB terminal.

When the load is set in a normal operation, both of the output power and the feedback voltage at the FB terminal rise. Accordingly, since the feedback voltage is large, the output voltage of the error amplifier 41, i.e., the threshold voltage Vth of the comparator 45, also represents a large value. When the switching element 15 is set to on and when the drain current of the switching element 15 flows, the current detection voltage at the CS terminal occurs. When this current detection voltage reaches the threshold voltage Vth, the RS flip-flop 46 is reset, and the switching element 15 is set to off. While the switching element 15 is on, the current detection voltage at the CS terminal has a waveform similar to that of the drain current of the switching element 15, and the maximum value of the current detection voltage at the Detect terminal is half of that of the current detection voltage at the CS terminal.

When the switching power supply apparatus 10 is stopped, all of the output power, the drain current of the switching element 15, the current detection voltage at the CS terminal, the current detection voltage at the Detect terminal, the pulse signal at the OUT terminal, and the feedback voltage at the FB terminal are dropped to approximately 0 volt (V).

Next, a case in which the first current detection resistor 16 is short-circuited will be described. As illustrated in FIG. 6, the current detection voltages at the CS terminal and the Detect terminal represent the same operation waveform. The other operation waveforms are the same as those that appear when the first current detection resistor 16 and the second current detection resistor 17 are in a normal state.

When in a light load state, the maximum value of the current detection voltage at the CS terminal is based on the value of the feedback voltage at the FB terminal, and the current detection voltage at the Detect terminal is the same as the current detection voltage at the CS terminal.

When the load is set in a normal operation, the output power and the feedback voltage at the FB terminal rise. Accordingly, since the feedback voltage is large, the output voltage of the error amplifier 41 also represents a large value. However, the single-fault detection circuit 33 has detected a single fault of the first current detection resistor 16, and the switch 44 has selected the connection point of the resistors 42 and 43. Thus, the inverting input terminal of the comparator 45 receives the threshold voltage Vth/2. When the switching element 15 is set to on and when the drain current of the switching element 15 flows, the current detection voltage at the CS terminal occurs. When this current detection voltage reaches the threshold voltage Vth/2, the RS flip-flop 46 is reset, and the switching element 15 is set to off.

When the switching power supply apparatus 10 is stopped, all the output power, the drain current of the switching element 15, the current detection voltage at the CS terminal, the current detection voltage at the Detect terminal, the pulse signal at the OUT terminal, and the feedback voltage at the FB terminal are dropped to approximately 0 V.

Next, a case in which the second current detection resistor 17 is short-circuited will be described. As illustrated in FIG. 7, the current detection voltage at the CS terminal has a waveform similar to that of the drain current, and the current detection voltage at the Detect terminal is dropped to 0 V. The other operation waveforms are the same as those that appear when the first current detection resistor 16 and the second current detection resistor 17 are in a normal state.

When in a light load state in which the output power is low, the maximum value of the current detection voltage at the CS terminal is based on the value of the feedback voltage at the FB terminal, and the current detection voltage at the Detect terminal is 0 V.

When the load is set in a normal operation, the output power and the feedback voltage at the FB terminal rise. Accordingly, since the feedback voltage is large, the output voltage of the error amplifier 41 also represents a large value. However, the single-fault detection circuit 33 has detected a single fault of the second current detection resistor 17, and the switch 44 has selected the connection point of the resistors 42 and 43. Thus, the inverting input terminal of the comparator 45 receives the threshold voltage Vth/2. When the switching element 15 is set to on and when the drain current of the switching element 15 flows, the current detection voltage at the CS terminal occurs. When this current detection voltage reaches the threshold voltage Vth/2, the RS flip-flop 46 is reset, and the switching element 15 is set to off.

When the switching power supply apparatus 10 is stopped, all the output power, the drain current of the switching element 15, the current detection voltage at the CS terminal, the pulse signal at the OUT terminal, and the feedback voltage at the FB terminal are dropped to approximately 0 V.

As described above, even when a single fault caused by a short circuit of any one of the first current detection resistor 16 and the second current detection resistor 17 occurs, since the other current detection resistor still operates, the same normal current detection as before the occurrence of the single fault is performed, and therefore, the safety of the switching power supply apparatus 10 is improved. In addition, when the short circuit of the first current detection resistor 16 or the second current detection resistor 17 is resolved, a normal operation may be restored.

According to the above embodiment, when the single-fault detection circuit 33 detects a short circuit of the first current detection resistor 16 or the second current detection resistor 17, the threshold voltage of the comparator 45 in the control circuit 31 and the threshold voltage of the comparator 51 in the overcurrent detection circuit 34 are reduced by half. However, half of the original value of the threshold voltage of the comparator 45 in the control circuit 31 and half of the original value of the threshold voltage of the comparator 51 in the overcurrent detection circuit 34 may be set, and the current detection voltage at the CS terminal may be switched by the output signal of the single-fault detection circuit 33.

In the case of the semiconductor drive device and the power conversion apparatus having the above configuration, two resistors connected in series with each other are included as current detection resistors for detecting a main current of a switching element. Thus, even when one of the resistors is short-circuited, since the other resistor is able to detect the current, the same normal current detection as before the occurrence of the fault is performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A semiconductor drive device for controlling a switching element to which a first current detection resistor and a second current detection resistor that are connected in series with each other, based on a value of a main current flowing through the switching element detected by the first current detection resistor and the second current detection resistor, the semiconductor drive device comprising:
   a single-fault detection circuit configured to
      receive a first current detection voltage at a connection point between the switching element and the first current detection resistor and a second current detection voltage at a connection point between the first current detection resistor and the second current detection resistor, and
      detect a short-circuit state of the first current detection resistor or the second current detection resistor; and
   a control circuit including
      a comparator configured to determine a switching control timing of the switching element by comparing the first current detection voltage with a first threshold voltage or a second threshold voltage, and
      a threshold voltage switching circuit configured to output the first threshold voltage while the single-fault detection circuit detects neither a short-circuit state of the first current detection resistor nor a short-circuit state of the second current detection resistor, and to output the second threshold voltage, which is less than the first threshold voltage, upon the single-fault detection circuit detecting either the short-circuit state of the first current detection resistor or the short-circuit state of the second current detection resistor.

2. The semiconductor drive device according to claim 1, wherein the single-fault detection circuit includes
   a first voltage-receiving resistor, a second voltage receiving resistor and a third voltage-receiving resistor, which are connected in series with one another and receive the first current detection voltage,
   a first comparator having a non-inverting input terminal connected to a connection point between the first voltage-receiving resistor and the second voltage-receiving resistor, and an inverting input terminal to which the second current detection voltage is applied,
   a second comparator having an inverting input terminal connected to a connection point between the second voltage-receiving resistor and the third voltage-receiving resistor, and a non-inverting input terminal to which the second current detection voltage is applied, and
   an AND circuit that receives an output of the first comparator and an output of the second comparator.

3. The semiconductor drive device according to claim 1, wherein the threshold voltage switching circuit of the control circuit includes
   a voltage-dividing circuit configured to divide the first threshold voltage to generate the second threshold voltage, and
   a switch configured to select the first threshold voltage while the single-fault detection circuit detects neither a short-circuit state of the first current detection resistor nor a short-circuit state of the second current detection resistor, and to select the second threshold voltage upon the single-fault detection circuit detecting either the short-circuit state of the first current detection resistor or the short-circuit state of the second current detection resistor.

4. The semiconductor drive device according to claim 1, further comprising an overcurrent detection circuit including
- an overcurrent detection comparator configured to compare the first current detection voltage with a first overcurrent detection threshold voltage or a second overcurrent detection threshold voltage, and
- an overcurrent detection threshold voltage switching circuit configured to output the first overcurrent detection threshold voltage while the single-fault detection circuit detects neither a short-circuit state of the first current detection resistor nor a short-circuit state of the second current detection resistor, and to output the second overcurrent detection threshold voltage, which is less than the first overcurrent detection threshold voltage, upon the single-fault detection circuit detecting either the short-circuit state of the first current detection resistor or the short-circuit state of the second current detection resistor.

5. A power conversion apparatus, comprising:
a switching element;
a first current detection resistor and a second current detection resistor that are connected in series with each other for detecting a main current flowing through the switching element; and
- a semiconductor drive device configured to control a switching operation of the switching element based on a value of the main current detected by the first current detection resistor and the second current detection resistor, wherein the semiconductor drive device includes:
a single-fault detection circuit configured to
- receive a first current detection voltage that appears at a connection point between the switching element and the first current detection resistor, and a second current detection voltage that appears at a connection point between the first current detection resistor and the second current detection resistor, and
- detect a short-circuit state of the first current detection resistor or the second current detection resistor; and a control circuit including
- a comparator configured to determine a switching control timing of the switching element by comparing the first current detection voltage with a first threshold voltage or a second threshold voltage, and
- a threshold voltage switching circuit configured to output the first threshold voltage while the single-fault detection circuit detects neither the short-circuit state of the first current detection resistor nor the short-circuit state of the second current detection resistor, and to output the second threshold voltage, which is less than the first threshold voltage, upon the single-fault detection circuit detecting either the short-circuit state of the first current detection resistor or the short-circuit state of the second current detection resistor.

6. The power conversion apparatus according to claim 5, wherein the semiconductor drive device includes an overcurrent detection circuit including
- an overcurrent detection comparator configured to compare the first current detection voltage with a first overcurrent detection threshold voltage or a second overcurrent detection threshold voltage, and
- an overcurrent detection threshold voltage switching circuit configured to output the first overcurrent detection threshold voltage while the single-fault detection circuit detects neither the short-circuit state of the first current detection resistor nor the short-circuit state of the second current detection resistor, and to output the second overcurrent detection threshold voltage, which is less than the first overcurrent detection threshold voltage, upon the single-fault detection circuit detecting either the short-circuit state of the first current detection resistor or the short-circuit state of the second current detection resistor.

\* \* \* \* \*